US011891033B2

(12) United States Patent
Beier et al.

(10) Patent No.: US 11,891,033 B2
(45) Date of Patent: Feb. 6, 2024

(54) METHOD FOR DETERMINING A CLEARANCE OF AN ELECTROMECHANICAL BRAKE, BRAKE, AND CONTROL UNIT

(71) Applicant: ZF CV Systems Europe BV, Brussels (BE)

(72) Inventors: Peter Beier, Wunstorf (DE); Arne Reiners, Hannover (DE)

(73) Assignee: ZF CV Systems Europe BV, Brussels (BE)

( * ) Notice: Subject to any disclaimer, the term of this patent is extended or adjusted under 35 U.S.C. 154(b) by 402 days.

(21) Appl. No.: 17/417,124

(22) PCT Filed: Dec. 10, 2019

(86) PCT No.: PCT/EP2019/084429
§ 371 (c)(1),
(2) Date: Jun. 22, 2021

(87) PCT Pub. No.: WO2020/143974
PCT Pub. Date: Jul. 16, 2020

(65) Prior Publication Data
US 2022/0073049 A1  Mar. 10, 2022

(30) Foreign Application Priority Data
Jan. 7, 2019 (DE) .................. 10 2019 100 183.8

(51) Int. Cl.
*B60T 17/22* (2006.01)
*B60T 13/66* (2006.01)
(Continued)

(52) U.S. Cl.
CPC .......... *B60T 17/221* (2013.01); *B60T 13/662* (2013.01); *F16D 66/026* (2013.01); *H02P 6/24* (2013.01);
(Continued)

(58) Field of Classification Search
CPC ...... B60T 17/221; B60T 13/662; B60T 17/22; F16D 66/026; F16D 65/18;
(Continued)

(56) References Cited

U.S. PATENT DOCUMENTS 9,457,782 B2 * 10/2016 Yao ........................... B60T 7/22
10,422,396 B2 * 9/2019 Yao .......................... B60T 1/065
(Continued)

FOREIGN PATENT DOCUMENTS

| AT | 516801 A2 | 8/2016 |
| DE | 19730094 A1 | 1/1999 |

(Continued)

OTHER PUBLICATIONS

European Patent Office, Rijswijk, Netherlands, International Search Report of International Application No. PCT/EP2019/084429, dated Apr. 29, 2020, 2 pages.

*Primary Examiner* — Rachid Bendidi
(74) *Attorney, Agent, or Firm* — Dickinson Wright PLLC (57) ABSTRACT

A method for determining a clearance of an electromechanical brake involves the following steps: Activating a clearance determination cycle for the brake, moving an electromechanical brake actuator by a drive motor into a first end position, moving the electromechanical brake actuator via the drive motor toward a second end position, continuously determining a rotor position and/or a motor current of the drive motor during the movement of the brake actuator toward the second end position, determining a contact position at which the brake pad comes into contact with the brake disc, on the basis of the rotor position and/or of the motor current, and determining a clearance and/or a degree of pad wear on the basis of the determined contact position. A suitable electomechanical brake and a respective control unit carry out the method.

10 Claims, 5 Drawing Sheets

(51) Int. Cl.
    *H02P 6/28*     (2016.01)
    *F16D 66/02*     (2006.01)
    *H02P 6/24*     (2006.01)
    *F16D 65/18*     (2006.01)
    *F16D 66/00*     (2006.01)
    *F16D 121/24*     (2012.01)

(52) U.S. Cl.
    CPC ............... *H02P 6/28* (2016.02); *F16D 65/18* (2013.01); *F16D 2066/003* (2013.01); *F16D 2121/24* (2013.01)

(58) Field of Classification Search
    CPC .......... F16D 2066/003; F16D 2121/24; F16D 66/021; H02P 6/24; H02P 6/28
    See application file for complete search history.

(56) References Cited

U.S. PATENT DOCUMENTS

| | | | | |
|---|---|---|---|---|
| 2010/0168979 | A1* | 7/2010 | Baier-Welt | F16D 65/14 |
| | | | | 701/76 |
| 2017/0341633 | A1* | 11/2017 | Blattert | B60T 13/146 |
| 2021/0197777 | A1* | 7/2021 | Itakura | B60T 1/065 |

FOREIGN PATENT DOCUMENTS

| | | |
|---|---|---|
| DE | 102006029699 A1 | 1/2008 |
| DE | 102007004604 A1 | 7/2008 |
| DE | 102014212605 A1 | 12/2015 |
| EP | 2927068 A2 | 10/2015 |
| GB | 2333335 A | 7/1999 |

* cited by examiner

METHOD FOR DETERMINING A CLEARANCE OF AN ELECTROMECHANICAL BRAKE, BRAKE, AND CONTROL UNIT

TECHNICAL FIELD

The invention relates to a method for determining a clearance of an electromechanical brake, in particular a commercial vehicle brake, as well as to a suitable brake and a control unit for performing the method.

BACKGROUND

Electromechanical brakes with drives for generating a braking torque are widely known in the motor vehicle industry, particularly in the commercial vehicle industry. Thus, AT 516 801 A2, for example, discloses such a brake with an electromechanical brake actuator. The general aim is to operate a brake with electrical energy. A significant challenge here is to achieve sufficiently short brake actuation times.

In order to achieve constant and short brake actuation times and in order to achieve a constant application force, setting the so-called clearance plays a central role. In this context, the term "clearance" denotes the distance between at least one brake pad and the brake disc of a brake in the unbraked state. In the case of braking, the clearance must be overcome by a brake pad applied toward the brake disc before there is a mechanical frictional effect between the brake disc and the brake pad and thus a braking effect occurs.

Owing, inter alia, to progressive wear of the brake pads over their service life, the clearance is subject to unwanted changes. In order to compensate for this, the prior art discloses mechanical wear readjustments, by means of which the clearance is set to a constant value. However, such setting of the clearance to a constant value may be insufficient for an electromechanical brake, depending on the principle of operation of the application unit.

It is therefore likewise known to determine the pad wear by means of wear sensors and, on the basis of this, to vary the clearance appropriately as a function of the pad wear. However, this has the disadvantage that such sensors increase the complexity of an electromechanical brake, are cost-intensive and, in the event of a failure, are expensive to replace.

SUMMARY

Against this background, the object underlying the invention was to develop a method of the type mentioned at the outset in such a way that the disadvantages found in the prior art were as far as possible eliminated. In particular, the task was to specify a method for determining a clearance which did not require external sensors and made it possible to determine a clearance in a simple and low-cost manner.

According to the invention, the problem is solved in a method of the type mentioned at the outset by the steps of: activating a clearance determination cycle for the brake, moving an electromechanical brake actuator by means of a drive motor into a first end position, in which the brake is in a non-applied state, moving the electromechanical brake actuator by means of the drive motor toward a second end position, wherein the movement of the brake actuator applies at least one brake pad of the brake toward a brake disc, continuously determining a rotor position and/or a motor current of the drive motor during the movement of the brake actuator toward the second end position, determining a contact position, at which the brake pad comes into contact with the brake disc, on the basis of the rotor position and/or of the motor current, and determining a clearance and/or a degree of pad wear on the basis of the determined contact position.

The method is based on the recognition that the clearance can be determined without sensors using the operating parameters of the electromechanical brake actuator, in particular of the drive motor of the electromechanical brake actuator. For this purpose, the brake actuator is first of all moved by the drive motor into a first end position, in which the brake is in a non-applied state. From this position, the brake is applied toward an application position and, during this process, the position of the rotor of the drive motor and/or the motor current are continuously determined and recorded. On the basis of the variation in the rotor position and/or of the motor current, the contact position at which the brake pad comes into contact with the brake disc is determined without the need for the use of further sensors. A clearance and/or a degree of pad wear is then determined from the contact position.

Overall, the clearance is thus determined in a low-cost manner with the best possible use of the components already present, this being associated overall with a reduction in complexity of the electromechanical brake.

The invention is further developed in that determining the contact position on the basis of the rotor position comprises the steps of: defining a maximum current for the drive motor, operating the drive motor with a motor current which is less than or equal to the maximum current, determining a rotor end position of the drive motor for which no further change in the rotor position of the drive motor of the brake actuator occurs for the given maximum current, and determining the contact position from the rotor end position, in particular on the basis of first correlation parameters.

In other words, a maximum current for the drive motor is first defined which is sufficiently large to apply the electromechanical brake in the context of the clearance determination cycle, but which is typically significantly lower than the maximum current which is used for an electromechanical braking operation. The drive motor is then operated during application with a motor current which is less than or equal to the maximum current. If the brake pad comes into contact with the brake disc at the contact position after overcoming the clearance, this has the effect that the drive motor current increases as a result of the higher mechanical resistance at the drive motor and is limited to the maximum current limit. After the contact position has been reached, only a slight further rotation of the rotor of the drive motor takes place owing to the limitation of the maximum current. The drive then reaches its rotor end position. Using correlation parameters, it is possible, from the rotor end position, to determine the contact position, from which in turn the clearance and/or a degree of pad wear can be determined.

The contact position and the clearance can thus advantageously be determined without the use of external sensors from operating parameters that have to be determined in any case, such as current intensities and rotor positions.

According to a preferred development, the first correlation parameters comprise at least one of the following parameters: current intensity, last determined degree of pad wear, transmission ratio of a transmission of the brake actuator. Knowledge of the parameters and the use thereof for calculating the contact position and the clearance has proven to be preferable for increasing the determination accuracy.

According to a preferred development, determining the contact position on the basis of the motor current comprises the steps of: detecting a change in the motor current, in particular a first increase in the motor current, determining the corresponding rotor position at which the current increase of the motor current occurs for the first time, determining the contact position from the rotor position, in particular on the basis of second correlation parameters.

When determining the contact position on the basis of the motor current, the motor current is monitored during the application of the electromechanical brake. Of particular importance here is the point in time at which the motor current increases for the first time after the clearance has been overcome and the brake pad has come into contact with the brake disc. This increase in the motor current serves to indicate that the brake pad has come into contact with the brake disc. For this event, the corresponding rotor position of the drive motor is determined, and the contact position is then determined from this rotor position. Second correlation parameters are preferably used to increase the determination accuracy. The second correlation parameters preferably comprise a last-determined degree of pad wear and/or a transmission ratio of a transmission of the brake actuator. In this case, the second correlation parameters can be identical to or different from the first correlation parameters.

Advantageously, this alternative embodiment of the method also permits determination of a clearance without sensors, without the need to have available further sensors, which increase complexity.

According to a preferred development, the method further comprises the step of: storing at least one of the following in a memory, in particular in a memory of a control unit: determined contact position, clearance, degree of pad wear. After storage in the memory, the parameters mentioned can be made available for a large number of applications and can furthermore be used for subsequent clearance determination cycles, e.g. for the purpose of increasing measurement accuracy.

In a further aspect, the invention relates to a control unit for determining a clearance of an electromechanical brake, in particular a commercial vehicle brake, having an interface for the signal-conducting connection of the control unit to a brake actuator, a memory and a processor.

The invention achieves the object mentioned at the outset with respect to the control unit, in that the control unit is configured to activate a clearance determination cycle for the brake, to move an electromechanical brake actuator by means of a drive motor into a first end position, in which the brake is in a non-applied state, to move the electromechanical brake actuator by means of the drive motor toward a second end position, wherein the movement of the brake actuator applies at least one brake pad of the brake toward a brake disc, to continuously determine a rotor position and/or a motor current of the drive motor during the movement of the brake actuator toward the second end position, to determine a contact position, at which the brake pad comes into contact with the brake disc, on the basis of the rotor position and/or of the motor current, and to determine a clearance and preferably a degree of pad wear on the basis of the determined contact position.

Thus, the control unit according to the invention is also capable of determining the clearance and preferably a degree of pad wear, using drive motor characteristic values, such as motor current and rotor position. Thus, the control unit does not require sensor signals from external sensors to determine the clearance.

According to the invention, the control unit is further developed in that, in order to determine the contact position on the basis of the rotor position, it is configured to define a maximum current for the drive motor, to operate the drive motor with a motor current which is less than or equal to the maximum current, to determine a rotor end position of the drive motor for which no further change in the rotor position of the brake actuator occurs for the given maximum current, and to determine a contact position from the rotor end position, in particular on the basis of first correlation parameters.

With regard to the advantages, reference may be made to the above explanations of the method according to the invention, and these are incorporated here. In summary, the maximum motor current for the clearance determination cycle is limited, so that although this is large enough to apply the brake until the clearance is overcome, the brake is then applied at most only slightly further. If the brake pad comes into contact with the brake disc, the position of the rotor of the drive motor does not change further or only slightly because of the current limitation, it then being possible to draw a conclusion about the contact position and ultimately the clearance from the rotor end position.

According to a preferred embodiment, the control unit for determining the contact position on the basis of the motor current is configured to detect a change in the motor current, in particular a first increase in the motor current, to determine a corresponding rotor position at which the current increase of the motor current occurs for the first time, and to determine a contact position from the rotor position, in particular on the basis of second correlation parameters.

In this case, the control unit makes use of the insight that an increase in the motor current during the application of the electromechanical brake provides an indicator that the drive motor has to overcome a greater torque, which in turn correlates with the fact that the brake pad comes into contact with the brake disc and the required application force increases after the clearance has been overcome. Reference may again be made to the above explanations of the method according to the invention, and their content is incorporated here.

In a further aspect, the invention relates to an electromechanical brake, in particular for commercial vehicles, having a brake disc, at least one brake pad accommodated in a brake caliper, an electromechanical brake actuator having an electromechanical drive motor for applying the at least one brake pad toward the brake disc, and a control unit.

The invention achieves the object designated at the outset with respect to the electromechanical brake by configuring the control unit according to one of the preceding exemplary embodiments.

The invention furthermore achieves the object designated at the outset with respect to a computer program product which comprises instructions that execute the method according to one of the exemplary embodiments associated with the method on a control unit according to one of the abovementioned exemplary embodiments.

The electromechanical brake and the computer program product make use of the same advantages and preferred embodiments as the method according to the invention and the control unit according to the invention. Reference is made in this regard to the above explanations, and their content is incorporated here.

Exemplary embodiments of the invention are now described below with reference to the drawings. These are not necessarily intended to represent the exemplary embodiments to scale; on the contrary, drawings are executed in schematic and/or slightly distorted form, where useful for explanation. With regard to additions to the teachings directly recognizable from the drawings, attention is drawn to the relevant prior art. It should be borne in mind here that many modifications and changes relating to the form and detail of an embodiment can be made without departing from the general concept of the invention. The features of the invention which are disclosed in the description, in the drawings and in the claims may be essential for the development of the invention, both individually and in any desired combination. Moreover, all combinations of at least two of the features disclosed in the description, in the drawings and/or in the claims fall within the scope of the invention. The general concept of the invention is not limited to the exact form or detail of the preferred embodiment shown and described below, nor is it limited to subject matter which would be restricted in comparison with the subject matter claimed in the claims. In the case of specified dimensioning ranges, the intention is also to disclose values lying within the limits mentioned as limit values and to allow for them to be used and claimed in any way. For the sake of simplicity, identical parts or parts with identical or similar functions are provided below with the same reference signs. Further advantages, features and details of the invention will become apparent from the following description, the preferred embodiments and the appended drawings.

DETAILED DESCRIPTION OF THE DRAWINGS

Figure 1:
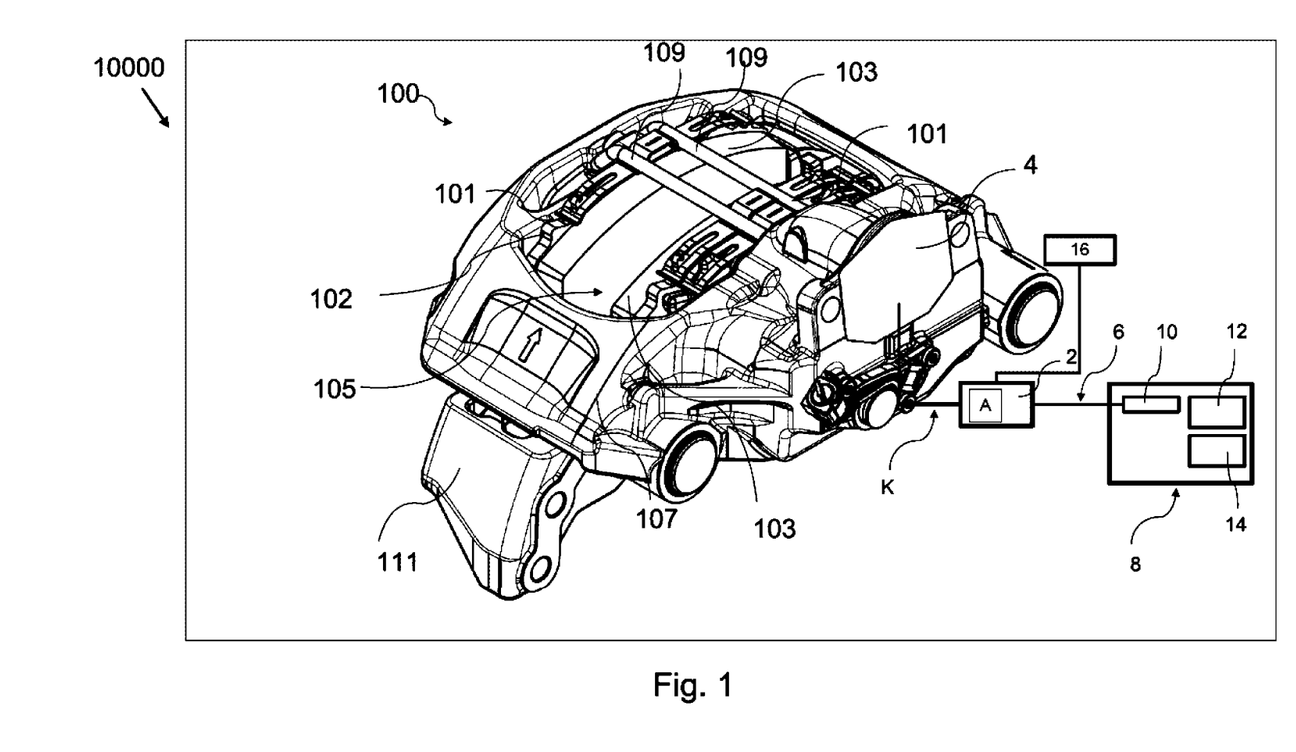
FIG. 1 shows a first exemplary embodiment of an electromechanical brake according to the invention with a control unit for determining the clearance in a perspective view.

FIG. 1 shows a vehicle system 10000 having an electromechanical brake 100. The electromechanical brake 100 has a brake carrier 111 and a caliper 107. Brake pads 103 are guided and mounted on the brake carrier 111. By means of an electromechanical brake actuator 2, the brake pads 103 can be moved toward a receiving space 105 for a brake disc (not shown) and can be applied to such a disc. The brake pads 103 are held in position by hold-down brackets 109 and hold-down springs 101. After removal of the hold-down bracket 109 and the hold-down springs 101, the brake pads 103 can be removed from the brake carrier 111 and can be replaced. The brake carrier 111 also has a pad back plate 102 for laterally guiding the brake pads 103.

If the electromechanical brake 100 is in a non-actuated state, that is to say if no application force is applied to the brake pads 103 by the brake actuator 2, there is a clearance L between the brake pad 103 and the brake disc. The position at which at least one brake pad 103 comes into contact with the brake disc for the first time after the clearance L has been overcome is referred to as the contact position K. The brake 100 is applied by the application of an actuating force by the brake actuator 2 to an interface for an application mechanism 4, which in turn brings about application of the brake pads 103 toward the brake disc.

The brake actuator 2 has a drive motor A for generating a drive force or a drive torque. The brake actuator 2 receives an actuator signal 16 for the actuation of the brake actuator 2. The brake actuator 2 is furthermore connected bidirectionally via a signal-conducting connection 6 to an interface 10 of a control unit 8. The control unit 8 is configured to determine, by means of the brake actuator 2 and its drive A without recourse to further external sensors, a contact position K, in which the brake pads 103 come into contact with the brake disc 105 for the first time. The control unit 8 also has a memory 12 and a processor 14. The signal-conducting connection 6 can be configured both as a wired connection and as a wireless connection. In particular, the signal-conducting connection 6 is configured to transmit a motor current i and a position of the rotor φ of the drive motor A to the interface 10 and thus to the control unit 8.

Figure 2:
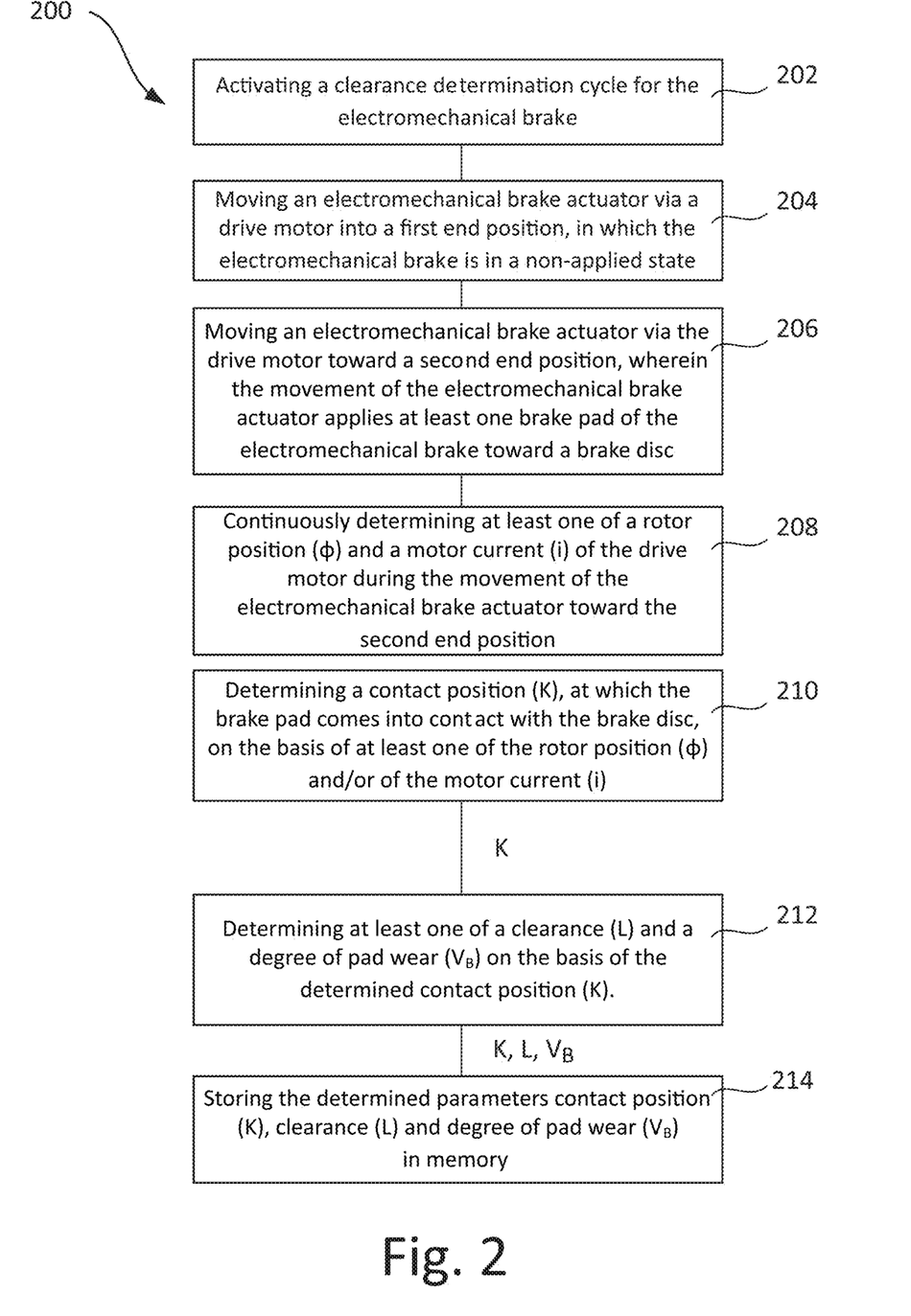
FIG. 2 shows a block diagram of a method according to the invention for determining a clearance of an electromechanical brake.

A method 200 for determining a clearance of an electromechanical brake 100 is illustrated in FIG. 2 using a block diagram. The method is initiated in step 202 by activating a clearance determination cycle. Subsequently, in step 204, the electromechanical brake actuator 2 is moved into a first end position E1 (cf. also FIGS. 4 and 5), which corresponds to an open, that is to say an unbraked, electromechanical brake 100. In step 206, the electromechanical brake actuator 2 is moved from this first end position E1 by the drive A toward a second end position E2 (cf. likewise FIGS. 4 and 5). The brake 100 is thereby applied.

During the movement according to step 206, a continuous determination of a rotor position φ and/or of a motor current i of the drive motor A takes place in step 208. On the basis of the rotor position φ and/or of the motor current i, there takes place in step 210 a determination of a contact position K, at which the brake pad or pads 103 come into contact with a brake disc. Finally, on the basis of the contact position K, a clearance L and a degree of pad wear $V_B$ are determined in step 212, wherein the determined parameters contact position K, clearance L and degree of pad wear $V_B$ are stored in memory 12 in step 214.

Figure 3:
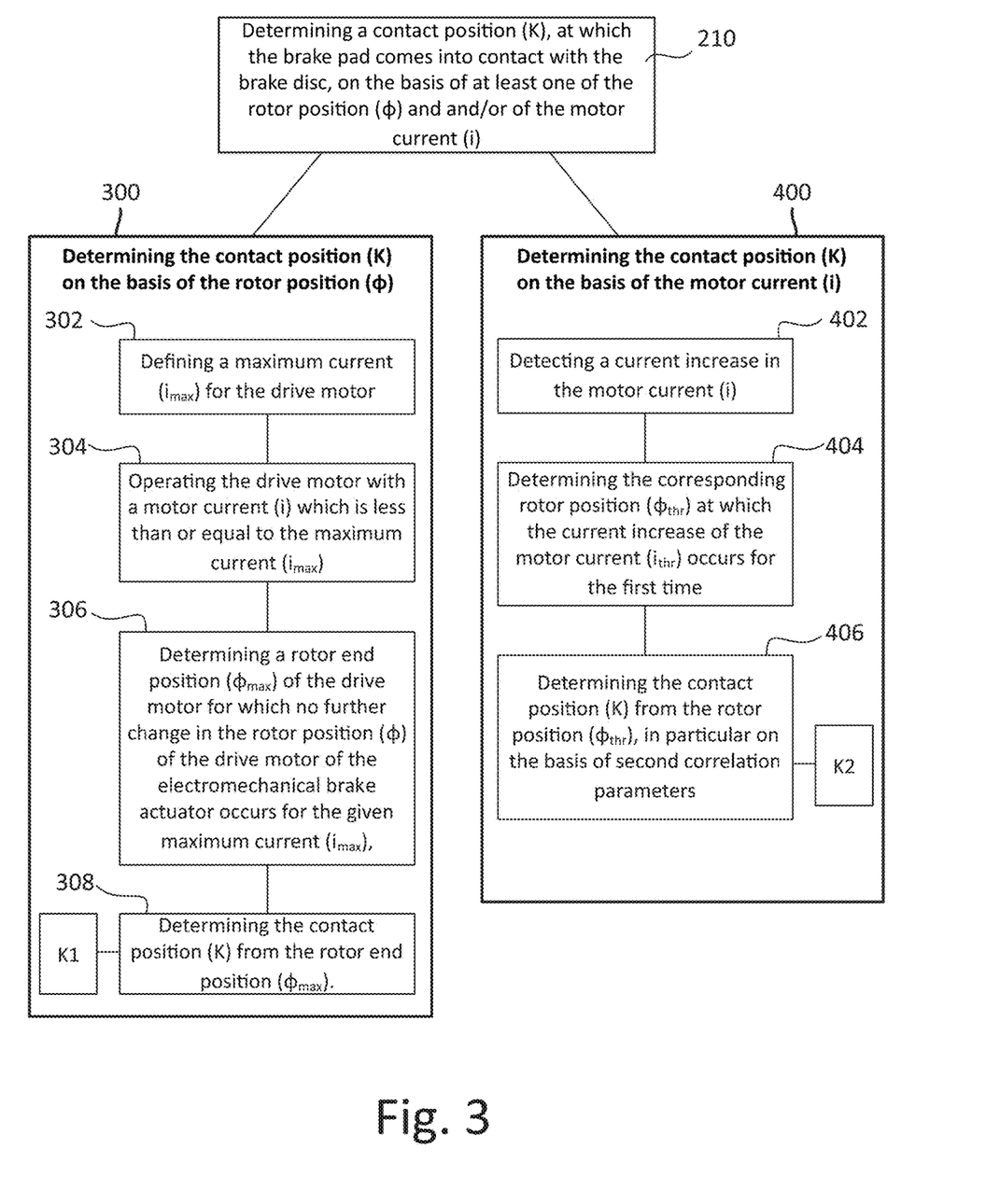
FIG. 3 shows a block diagram which details the method steps according to the invention for determining the contact position.

The step of determining a contact position K according to step 210 is further detailed in FIG. 3 on the basis of the block diagram illustrated there. Two options are available for determining the contact position K: the contact position K can be determined, on the one hand, on the basis of a rotor position φ of the drive A according to the branch 300 and/or on the basis of the rotor current i of the drive A according to the branch 400.

In order to determine the contact position K on the basis of the rotor position φ according to branch 300, a maximum motor current $i_{max}$ for the drive motor A is first defined according to step 302. The maximum motor current $i_{max}$ is selected in such a way that, although this permits the clearance L to be overcome by the brake actuator 2, it is so small that no significant further application of the electromechanical brake 100 is possible after the brake pads 103 come into contact with a brake disc. According to step 304, the drive motor A is then operated with a motor current i which is less than or equal to the maximum motor current $i_{max}$.

After the clearance L has been overcome, the brake pad 103 comes into contact with a brake disc at the contact position K, as a result of which the drive torque of the drive A to be applied, and consequently also the motor current i, increases. Owing to the limitation of the maximum motor current to $i_{max}$, no significant further application of the electromechanical brake 100 takes place after the brake pad 103 has come into contact with a brake disc. The rotor end position $\varphi_{max}$ of the drive A can be used to determine the contact rotor position in step 308. Furthermore, first correlation parameters K1 are used for determining the contact position K in step 308.

Alternatively, the contact position K can be determined on the basis of the rotor current i according to branch 400. In this case, continuous monitoring of the motor current i takes place during the actuation of the actuator 2 from the first end position E1 toward the second end position E2. If a brake pad 103 comes into contact with a brake disc after the clearance L has been overcome, the torque to be applied by the drive A and thus the motor current i increases. In step 402, the first increase in the motor current i is detected as limiting current $i_{thr}$, and the corresponding limiting rotor position $\varphi_{thr}$ is detected in step 404. With the aid of second correlation parameters K2, the contact position K is determined in step 406.

Figure 4:
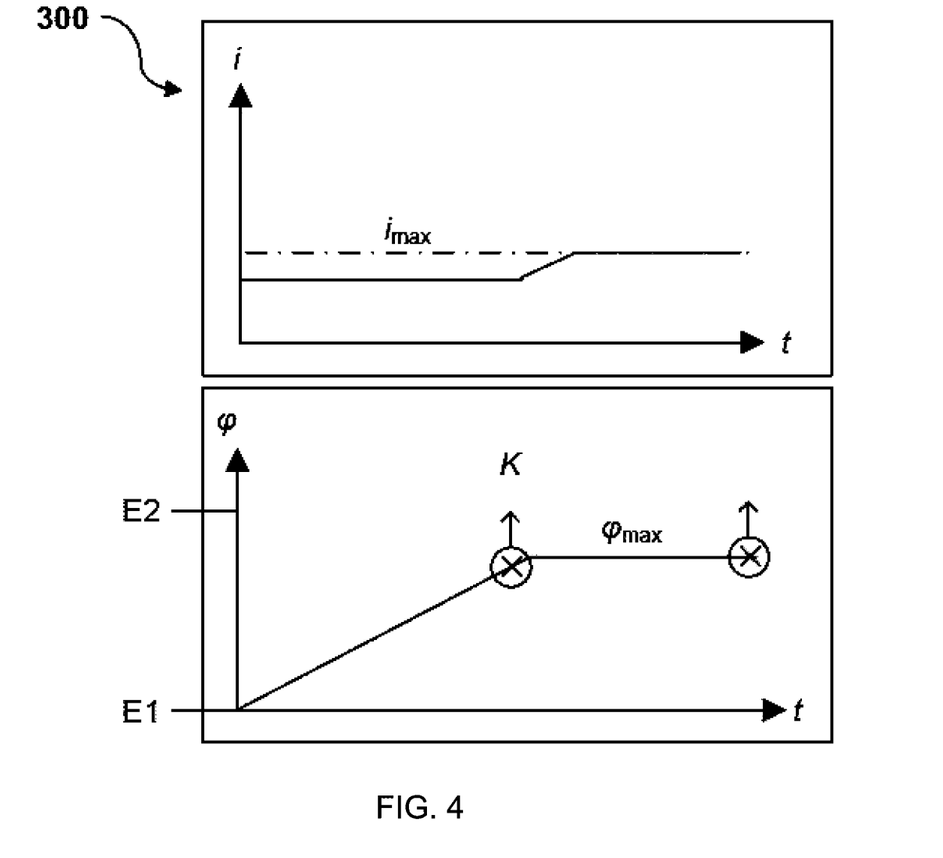
FIGS. 4 and 5 show diagrams intended to illustrate the methods according to the invention for determining the contact position on the basis of the rotor current and the rotor position.

The curves of motor current i and rotor position φ during the determination of contact position K on the basis of rotor position φ according to branch 300 are illustrated in FIG. 4. In the upper region of the diagram, the current intensity i is plotted against the time t, the rotor position φ being plotted against the time t in the lower region of the diagram. Here, the rotor position φ corresponds approximately to a movement of the brake actuator 2 from the first end position E1 toward the second end position E2. While the brake actuator 2 is overcoming the clearance L, the curve of the rotor position φ rises linearly, and the motor current i remains constant and below the defined maximum motor current $i_{max}$.

After the clearance L has been overcome, the brake pad 103 comes into contact with a brake disc, as a result of which the required torque of the drive A increases, which corresponds to an increase in the current i. The current i rises until the maximum motor current $i_{max}$ is reached. A constant rotor end position $\varphi_{max}$ is established for the state in which the motor current i corresponds to the maximum motor current $i_{max}$. As illustrated in FIG. 4, the contact position K does not necessarily correspond directly to the rotor end position $\varphi_{max}$ since, depending on the definition of the maximum motor current $i_{max}$, a slight further application of the electromechanical brake 100 takes place. For this reason, among other reasons, first correlation parameters K1 are used for determining the contact position K from the rotor end position φ max.

Figure 5:
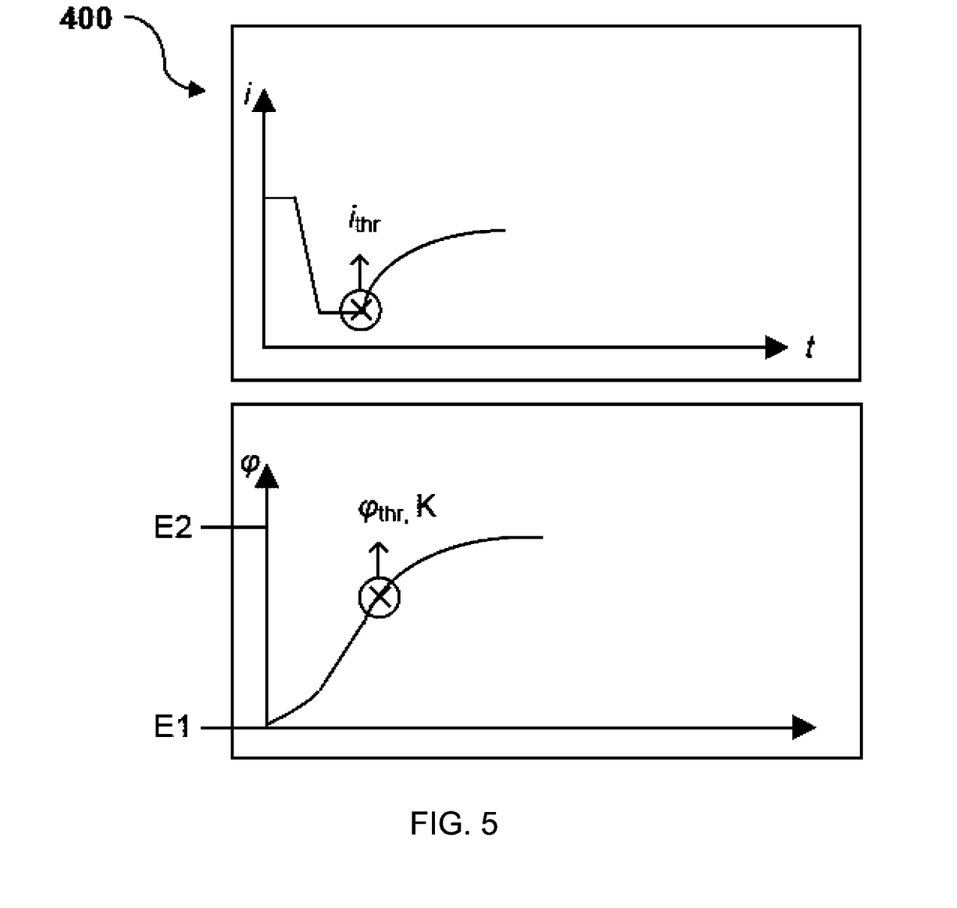

FIG. 5 visualizes the determination of the contact position K on the basis of the rotor current i according to branch 400. Again, the current intensity i and the rotor position φ are respectively plotted against time. When the electromechanical brake 100 is applied, a current i for accelerating the actuator 2 is first required, which current decreases after the acceleration of the actuator 2 and is reduced to a basic level during the overcoming of the clearance L. After the brake pad 103 comes into contact with a brake disc, the required torque of the drive A increases, this being accompanied by an increase in the current i. The limiting current $i_{thr}$, at which, starting from the basic level, an increase in the current i takes place for the first time, serves as an indicator for determining the contact position K in that the corresponding limiting rotor position $\varphi_{thr}$ is determined, and a contact position K is determined therefrom, optionally with the aid of second correlation parameters K2.

The invention claimed is:

1. A method (200) for determining a clearance (L) of an electromechanical brake (100), in particular a commercial vehicle brake, comprising the steps of:
   activating (202) a clearance determination cycle for the electromechanical brake (100),
   moving (204) an electromechanical brake actuator (2) via a drive motor (A) into a first end position (E1), in which the electromechanical brake (100) is in a non-applied state,
   moving (206) the electromechanical brake actuator (2) via the drive motor (A) toward a second end position (E2), wherein the movement of the electromechanical brake actuator (2) applies at least one brake pad (103) of the electromechanical brake (100) toward a brake disc,
   continuously determining (208) at least one of a rotor position (φ) and a motor current (i) of the drive motor (A) during the movement of the electromechanical brake actuator (2) toward the second end position (E2),
   determining (210) a contact position (K), at which the brake pad (103) comes into contact with the brake disc, on the basis of at least one of the rotor position (φ) and the motor current (i),
   determining (212) at least one of a clearance (L) and a degree of pad wear ($V_B$) on the basis of the determined contact position (K).

2. The method (200) as claimed in claim 1,
   wherein determining (300) the contact position (K) on the basis of the rotor position (φ) comprises the steps of:
   defining (302) a maximum current ($i_{max}$) for the drive motor (A),
   operating (304) the drive motor (A) with a motor current (i) which is less than or equal to the maximum current ($i_{max}$),
   determining (306) a rotor end position ($\varphi_{max}$) of the drive motor (A) for which no further change in the rotor position (φ) of the drive motor (A) of the electromechanical brake actuator (2) occurs for the given maximum current ($i_{max}$),
   determining a contact position (K) from the rotor end position ($\varphi_{max}$).

3. The method (200) as claimed in claim 2,
   wherein the contact position (K) is determined based on first correlation parameters (K1) comprising at least one of the following parameters:
   current amplitude,
   last determined degree of pad wear,
   transmission ratio of a transmission of the electromechanical brake actuator.

4. The method (200) as claimed in claim 1,
   wherein determining (400) the contact position (K) on the basis of the motor current (i) comprises the steps of:
   detecting (402) a current increase in the motor current (i),
   determining (404) the corresponding rotor position ($\varphi_{thr}$) at which the current increase of the motor current ($i_{thr}$) occurs for the first time,
   determining (406) a contact position (K) from the rotor position ($\varphi_{thr}$), in particular on the basis of second correlation parameters (K2).

5. The method (200) as claimed in claim 1, further comprising the step of:
  storing at least one of the following in a memory (12):
  the determined contact position (K),
  the clearance (L),
  the degree of pad wear ($V_B$).

6. A control unit (8) for determining a clearance (L) of an electromechanical brake (100), comprising:
  an interface (10) for the signal-conducting connection (6) of the control unit (8) to an electromechanical brake actuator (2);
  a memory (12) and a processor (14),
  wherein the control unit (8) is configured:
  to activate a clearance determination cycle (202) for the electromechanical brake (100),
  to move the electromechanical brake actuator (2) via a drive motor (A) into a first end position (E1), in which the electromechanical brake (100) is in a non-applied state,
  to move the electromechanical brake actuator (2) via the drive motor (A) toward a second end position (E2), wherein the movement of the electromechanical brake actuator (2) applies at least one brake pad (103) of the electromechanical brake (100) toward a brake disc,
  to continuously determine at least one of a rotor position ($\varphi$) and a motor current (i) of the drive motor (A) during the movement of the electromechanical brake actuator (2) toward the second end position (E2),
  to determine a contact position (K), at which the brake pad (103) comes into contact with the brake disc, on the basis of at least one of the rotor position ($\varphi$) and the motor current (i), and
  to determine a clearance (L) and a degree of pad wear ($V_B$) on the basis of the determined contact position (K).

7. The control unit (8) as claimed in claim 6,
wherein the control unit (8) for determining (300) the contact position (K) on the basis of the rotor position ($\varphi$) is configured
  to define (302) a maximum current ($i_{max}$) for the drive motor (A),
  to operate (304) the drive motor (A) with a motor current (i) which is less than or equal to the maximum current ($i_{max}$),
  to determine (306) a rotor end position ($\varphi_{max}$) of the drive motor (A) for which no further change in the rotor position ($\varphi$) of the electromechanical brake actuator (2) occurs for the given maximum current ($i_{max}$),
  to determine a contact position (K) from the rotor end position ($\varphi_{max}$), in particular on the basis of first correlation parameters (K1).

8. The control unit (8) as claimed in claim 6,
wherein the control unit (8) for determining (400) the contact position (K) on the basis of the motor current (i) is configured
  to detect (402) a change in the motor current (i), in particular a first increase in the motor current ($i_{thr}$),
  to determine (404) a corresponding rotor position ($\varphi_{thr}$) at which the current increase of the motor current ($i_{thr}$) occurs for the first time,
  to determine (406) a contact position (K) from the rotor position ($\varphi_{thr}$), in particular on the basis of second correlation parameters (K2).

9. An electromechanical brake (100) comprising:
  the brake disc,
  the at least one brake pad (103) accommodated in a brake caliper (107),
  the electromechanical brake actuator (2) with the drive motor (A) for applying the at least one brake pad (103) toward the brake disc, and
  the control unit (8) according to claim 6.

10. A non-transitory computer memory storing instructions and a processor configured for executing the instructions to perform the method (200) as claimed in claim 1.

* * * * *